United States Patent Office 2,957,107
Patented Oct. 18, 1960

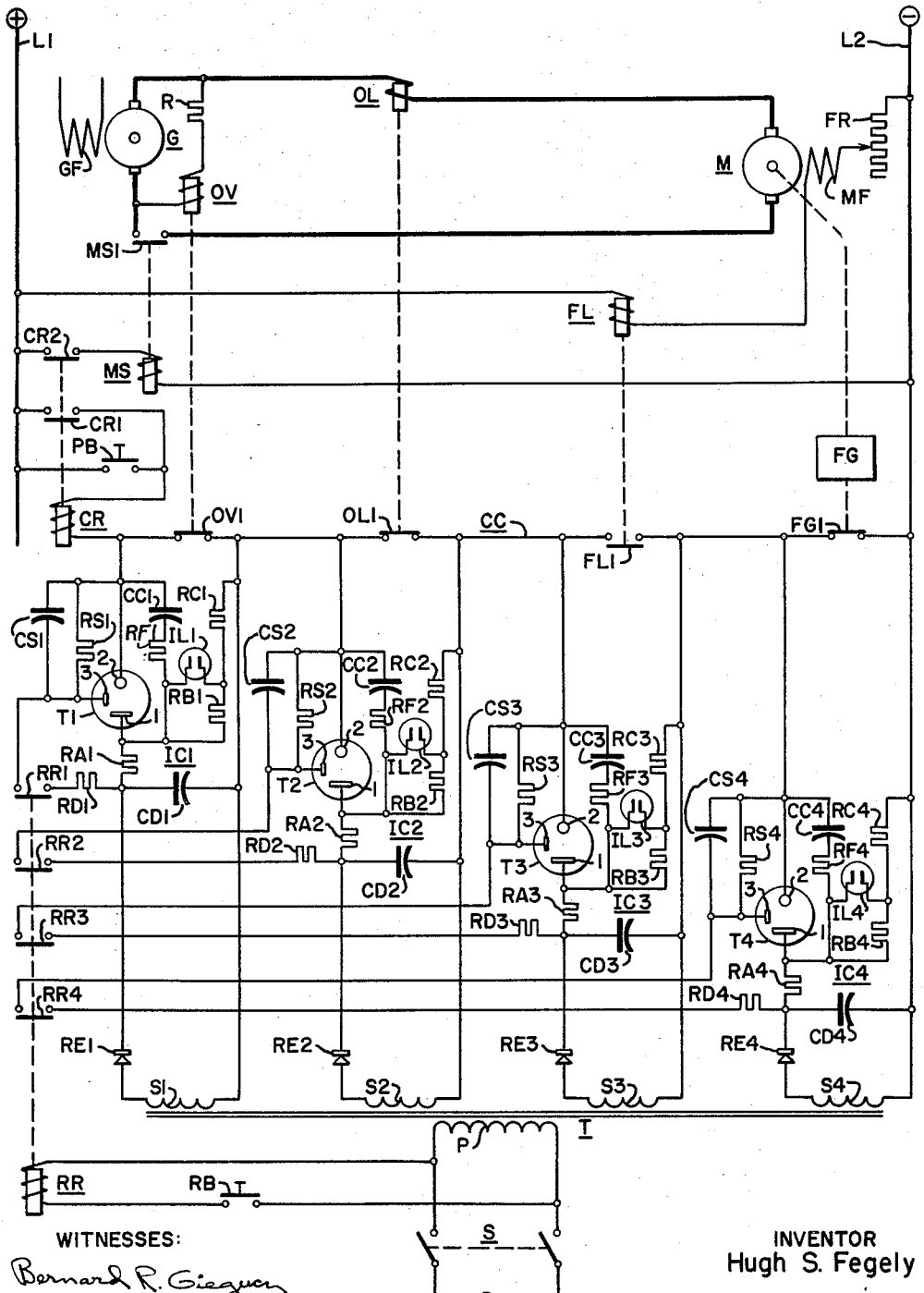

2,957,107
AUTOMATIC FAULT FINDER SYSTEM

Hugh S. Fegely, Snyder, N.Y., assignor to Westinghouse Electric Corporation, East Pittsburgh, Pa., a corporation of Pennsylvania Filed Apr. 3, 1959, Ser. No. 803,952

7 Claims. (Cl. 315—132)

The invention relates generally to indicating systems and more particularly to an automatic fault finder system wherein the fault finder system indicates the faulty circuit and continues such indication even after the fault is removed.

Many conventional automatic fault finder systems utilize gaseous discharge tubes and indicator lamps to locate and indicate a faulty circuit. Many of these circuits are arranged such that the aging of a particular tube or lamp can greatly vary the operating characteristics of the fault finder system. Thus, it is possible that a false indication from the fault finder system can occur.

It is an object of this invention to provide an automatic fault finder system in which aging of the components is of very little effect upon the operating characteristics of the system.

Another object of this invention is to provide an automatic fault finder system in which the elements in the system are subjected to a very low rate of aging.

Another object of my invention is to provide an automatic fault finder system wherein the reclosing of the monitored switch will nevertheless continue to indicate the location of the fault, thus providing a memory feature.

Further objects and advantages of my invention will be readily apparent from the following detailed description taken in conjunction with the accompanying drawing, in which the sole figure is a schematic diagram of an illustrative embodiment of my invention.

The automatic fault finder system is illustrated embodied in the electrical control of a conventional direct current variable voltage drive having a direct current generator G and a direct current motor M. The armatures of the generator and motor are connected in a series loop. A separately excited field winding GF, excited in any suitable manner, is provided for the generator. A separately excited field winding MF is provided for the motor and is illustrated as being excited from a suitable supply of direct current which may, for example, be the direct current supply represented by the conductors L1, L2. A field rheostat FR, which may be manually or automatically adjusted, allows control of the degree of excitation of the motor field winding MF.

Adjustable voltage drives of this type require protective devices capable of disconnecting the motor from the generator should overload or other fault conditions arise. Consequently, a control circuit CC is usually provided wherein the contacts of the protective devices may be connected in series to control a suitable relay or contactor to open the series loop circuit between the motor and generator armatures. An overvoltage relay OV in series with a resistor R across the generator, an overload relay OL, a motor field loss relay FL, and a speed responsive device driven by the motor such as a fly-ball governor FG, and having control contacts respectively designated as OV1, OL1, FL1 and FG1, are therefore provided. The contacts of the protective devices are series connected with the operating coil of a control relay CR and a momentary contact push-button PB across the supply of direct current voltage L1, L2. The push-button PB is utilized to initiate starting of the system whenever all the series connected contacts of the protective devices are closed. Upon actuation of the control relay CR, a set of normally open contacts CR1 bypass the momentary contact push-button PB while a second set of contacts CR2, normally open, close to energize the operating coil of a main switch or contactor MS. Actuation of the contactor MS causes its normally open contacts MS1 to close connecting the motor and generator armature circuits. The contactor MS is, of course, to be of interrupting capacity capable of handling the currents existing in the series loop circuit. Alternatively, if conditions permit, additional contacts of the control relay CR may be utilized to directly control the opening and closing of the circuit to be protected.

It is to be understood that contacts or switches such as overspeed and starter interlocks, which may not be connected in a control circuit CC may equally well be monitored. While the control circuit CC is illustrated connected across a direct current power source L1, L2 so that a direct current potential will appear across each contact to be monitored, it is not a requirement for proper operation of my invention and the automatic fault finder system will operate equally well without an external direct current voltage across the contacts of the particular protective device to be monitored.

The automatic fault finder system in accordance with my invention provides each switch or contact to be monitored with a separate individual indicating circuit. Accordingly, contacts OV1, OL1, FL1, and FG1 are monitored by their respective indicating circuit IC1, IC2, IC3, and IC4.

A separate isolated direct current source is provided for each indicating circuit. The arrangement herein illustrated comprises a transformer generally designated T, having a primary winding P adapted for connection to a suitable supply of alternating current through a line switch S and having respective secondary windings S1 through S4 connected to the respective indicating circuits. Respective series connected rectifiers RE1 through RE4 provide half-wave rectification of the secondary winding voltages of the transformer T while capacitors CD1 through CD4 are each respectively connected across the rectifier and secondary winding of each indicating circuit IC1 through IC4 to filter the alternating current ripple and provide an isolated direct current source for each indicating circuit.

Each individual direct current supply for each indicating circuit has a voltage divider connected thereacross comprising resistors RA1, RB1, and RC1 through resistors RA4, RB4 and RC4 respectively. Each voltage divider circuit is connected across the individual isolated direct current supply represented in the charge appearing across the respective capacitors CD1 through CD4 in the respective indicating circuits. The resistive elements in the voltage divider circuit are chosen so that the resistors RB and RC are of considerably greater magnitude than the resistor RA.

Each indicating circuit is provided with an indicating lamp IL1 through IL4 each connected across a respective one of the resistors RB1 through RB4. The indicating lamps may be of any suitable type such as a neon lamp having a firing characteristic in response to a predetermined minimum voltage magnitude across its terminals and capable of continuing conduction once fired at a magnitude considerably less than the required minimum voltage magnitude for firing.

Each indicating circuit IC1 through IC4 is provided with a gaseous discharge tube such as a cold cathode, gas filled, miniature type tube indicated at T1 through T4 respectively and hereafter referred to only as tubes T1 through T4. Each tube has an anode 1, a cathode 2, and a starting electrode 3. The anode 1 and cathode 2, in each case, are connected across a portion of the voltage divider circuit, namely, resistors RB1 and RC1 through RB4 and RC4 respectively, through its respective contact or switch to be monitored. The resultant voltage across the anode and cathode is insufficient to cause the tube to become conductive. The tube is utilized in a switching mode, that is, the tube will not conduct unless separately ignited by a starting potential on the starting electrode 3. The starting electrode 3 and anode 1, in each case, are serially connected across the remaining portion of the voltage divider circuit, namely resistor RA1 through RA4, through a resistor RD1 through RD4 respectively, by means of respective reset relay contacts RR1 through RR4 of a reset relay RR. The reset relay RR has an operating coil connected to be energized by the alternating current supply upon closing of a momentary contact reset push-button RB. The reset relay contacts are normally open and thus no starting voltage is applied to the starting electrodes 3. The resistors RD1 through RD4 in the starting electrode circuit limit the starting current when the starting electrode circuit is connected across the voltage dividing resistors RA1 through RA4, respectively. Each glow tube is provided with a capacitor CC1 through CC4, respectively and resistors RF1 through RF4, respectively in series and across each anode 1 and cathode 2 to prevent each tube from refiring as a result of inductive discharges which may occur across the contact or switch being monitored when it opens. At the same time each tube has connected across its starting electrode 3 and cathode 2 a capacitor CS1 through CS4 and resistor RS1 through RS4, respectively connected in parallel across one of said cathode 2 and starting electrode 3 circuits. The capacitor and resistor in the starting electrode-cathode circuit is used to stabilize the general operation of each glow tube T1 through T4.

Upon start-up of the adjustable voltage drive illustrated, appropriate direct current is applied to the positive and negative conductors L1 and L2. Field winding MF is excited, and the field loss relay FL is energized. The normally open contacts FL1 are closed so that all the contacts of the protective devices in series connection in the control circuit CC are closed. The momentary contact push-button PB is depressed actuating the control relays CR to its closed position with the contacts CR1 bypassing the push-button and the contacts CR2 connecting the operating coil of the main contactor MS across the leads L1, L2. The contacts MS1 are therefore closed to complete the circuit between the armatures of the generator G and the motor M. Energization of the generator field then allows control of the motor M in the usual manner.

To initiate operation of the automatic fault finder system, the line switch S is closed thereby connecting the alternating current source across the primary winding P of the transformer T so that an isolated direct current source is provided for each indicating circuit.

To initiate operation of the indicating circuit, the reset switch RB is closed thereby actuating the reset relay RR which closes all of its contacts RR1 through RR4 in the starting electrode circuits of the respective glow tubes T1 through T4. Thus, all of the tubes T1 through T4 are fired and continue to conduct when the reset relay is deenergized through release of the reset push-button.

With the monitored contacts closed and the reset relay RR energized momentarily, the gaseous discharge tubes T1 through T4 conduct causing a voltage drop across the resistor RA1 through RA4 of the respective indicating circuits. Conduction in this independent circuit drops the voltage across the remainder of the voltage divider, namely resistors RB1, RC1 through RB4, RC4, respectively.

It will be recalled that each neon indicator lamp IL is connected in its respective indicating circuit IC across the resistor RB1 through resistor RB4, respectively. Through conduction of the tube T the voltage across the indicating lamp IL is greatly reduced and is of insufficient magnitude to fire the lamp.

Should a fault occur, the particular monitored contact or switch will open, thereby causing conduction in its respective gaseous discharge tube to cease. As a result, little voltage drop will occur across its associated resistor RA. Since the resistive elements in the voltage divider circuit are chosen so that the resistors RB and RC are of considerably greater magnitude than the resistors RA, very little voltage will occur across the resistor RA and the resistors RB and RC will divide the potential from the isolated direct current source so that sufficient voltage will appear across the indicating lamp IL to cause its conduction. The indicating lamp IL will continue to give an indication of the faulted circuit as long as its associated tube T does not conduct. If two monitored contacts open which are separated by one or more other monitored contacts that did not open, only those which do open are indicated regardless of their location in the control circuit.

Should the monitored contact indicating a fault reclose, the indicator lamp will continue to enunciate the fault thus providing a memory feature. As a result, the operator may investigate the source of the fault condition even though the monitored relay has returned to its closed position. The tube T will not reinitiate conduction until the reset relay RR is manually actuated to fire the starting electrodes 1 in a manner described previously.

It is to be noted that the indicating lamp IL is only energized upon occurrence of a fault. Both the gaseous discharge tube T and the indicating lamp IL inherently experience aging. That is, the firing characteristics and potentials required to maintain conduction within the tubes will alter with age. My invention minimizes the aging effect by only energizing the indicating light IL upon occurrence of a fault. If both the gaseous discharge tube T and the indicating lamp IL were continually energized the aging effect would be cumulative and very easily affect the conduction of one or the other.

The indicating circuits are arranged to have a fail safe feature such that should the gaseous discharge tube T fail to conduct in its normal manner, the indicating lamp IL will be fired. The gaseous discharge tube T, which is continually conducting during normal operation, will be located, upon its failure, by the lighting of the indicating lamp IL in its associated circuit.

The condition of all the indicating lamps may be easily checked by momentarily interrupting the alternating current supply by opening and closing the line contacts S. In so doing, all the gaseous discharge tubes T will cease to conduct. Upon reapplication of the alternating current power, all indicating lamps in proper working order will provide a visual indication. To reestablish normal operation, it is only necessary to momentarily press the reset push-button, thereby firing the gaseous discharge tubes T causing the tubes to conduct. As a result, the indicating lamp IL will be deenergized and the automatic fault finder system will be once again ready to monitor the operation of the protective devices.

It is now readily apparent that this automatic fault finder system is capable of precisely indicating which one of the monitored contacts has opened and moreover will retain that indication even if the monitored contact should reclose. At the same time the aging effect of the tubes and indicating lamps has been greatly reduced. The tubes, which conduct continually during normal operation, are arranged in a fail safe circuit which will indicate the failure of the tubes to conduct in their normal manner.

While one specific embodiment of this invention has been illustrated and described, it is to be understood that various modifications, substitutions, and alterations within the spirit and scope of my invention are herein meant to be included.

I claim as my invention:

1. In an automatic fault finder system for a plurality of switches to be monitored, a gaseous discharge tube and an indicating lamp for each switch, each tube having an anode, a cathode, and a starting electrode, said anode and cathode of its associated tube connected in a common series circuit with the associated switch to be monitored, means for connecting an individual direct current source across each respective common series circuit, means for energizing each starting electrode to start conduction of each said tube, and voltage transfer means responsive to the non-conduction of said tube for applying a voltage of sufficient magnitude to cause said indicating lamp to fire.

2. In an automatic fault finder system for a plurality of switches to be monitored, a gaseous discharge tube, a voltage divider circuit, and an indicating lamp for each switch, each said tube having an anode, a cathode, and a starting electrode, said anode and cathode of its associated tube connected in a common series circuit with the associated switch to be monitored across a portion of its associated voltage divider circuit, each said voltage divider circuit adapted to be connected to separate isolated direct current sources respectively, an indicating lamp connected across a lesser part of said portion, means for energizing each starting electrode to start conduction of each said tube, each indicating lamp having a firing characteristic in response to a predetermined minimum magnitude of direct current voltage, the potential across said lesser part having a magnitude less than said predetermined minimum when the tube is conducting and greater than said minimum when the tube is non-conducting.

3. In an automatic fault finder system for a control circuit having a plurality of switches to be monitored, a like plurality of gaseous discharge tubes each having an anode, a cathode, and a starting electrode, a like plurality of individual circuits each including a respective one of said plurality of switches in series connection with the anode and cathode of a respective one of said plurality of tubes, a like plurality of voltage dividing circuits, means for providing a plurality of direct current sources each connected across a respective one of said voltage dividing circuits, each said individual circuit connected across a portion of a respective one of said voltage dividing circuits, a like plurality of indicating lamps each connected across a lesser part of said portion of a respective one of said plurality of voltage dividing circuits, means for energizing each starting electrode to start conduction of each said tube, each indicating lamp having a firing characteristic in response to a predetermined minimum magnitude of direct current voltage greater than the potential across said lesser part when the tube is conducting and less than the potential across said lesser part when the individual circuit is interrupted.

4. The automatic fault finder system of claim 3 characterized in that said switches to be monitored are connected in series in the control circuit.

5. The automatic fault finder system of claim 3 characterized in that said switches to be monitored are connected in series in the control circuit with said control circuit adapted to have a direct current voltage applied thereto.

6. In an automatic fault finder system for a control circuit having a plurality of switches to be monitored, a like plurality of gaseous discharge tubes each having an anode, a cathode, and a starting electrode, a like plurality of individual circuits each including a respective one of said plurality of switches in series connection with the anode and cathode of a respective one of said plurality of tubes, a like plurality of voltage dividing circuits, means for providing a plurality of direct current sources each connected across a respective one of said voltage dividing circuits, each said individual circuit connected across a portion of a respective one of said voltage dividing circuits, a like plurality of indicating lamps each connected across a lesser part of said portion of a respective one of said plurality of voltage dividing circuits, means for energizing each starting electrode to start conduction of each said tube, each indicating lamp having a firing characteristic in response to a predetermined minimum magnitude of direct current voltage greater than the potential across said lesser part when the tube is conducting and less than the potential across said lesser part when the individual circuit is interrupted and switching means for simultaneously disconnecting said first and second mentioned means and for connecting said second means only after said first means.

7. An automatic fault finder system comprising, a control circuit having a plurality of switches to be monitored connected in series therein and adapted to have a direct current voltage applied thereto, a plurality of gaseous discharge tubes each having an anode, a cathode, and a starting electrode, a plurality of individual circuits each including a respective one of said plurality of switches in series connection with the anode and cathode of a respective one of said plurality of tubes, a like plurality of voltage dividing circuits, means for providing a plurality of direct current sources each connected across a respective one of said voltage dividing circuits, each said individual circuit connected across a portion of a respective one of said voltage dividing circuits, a like plurality of indicating lamps each connected across a lesser part of said portion, each indicating lamp having a firing characteristic in response to a predetermined minimum magnitude of direct current voltage greater than the potential across said lesser part when the tube is conducting and less than the potential across said lesser part when the individual circuit is interrupted, a starting electrode switch for each starting electrode, a plurality of starting circuits each including a starting switch in series connection with the starting electrode and anode of a respective one of said plurality of tubes, each starting circuit connected across the remaining portion of a respective one of said voltage dividing circuits, and means operatively connected with said starting electrode switches for temporarily closing the starting electrode switches and initiating conduction of said tubes.

References Cited in the file of this patent

UNITED STATES PATENTS

| | | |
|---|---|---|
| 2,558,637 | Walz | June 26, 1951 |
| 2,680,212 | Frazier | June 1, 1954 |
| 2,719,966 | Schurr | Oct. 4, 1955 |
| 2,871,410 | Matulitis | Jan. 27, 1959 |